(12) United States Patent  
Ghosh et al.

(10) Patent No.: US 8,843,770 B2
(45) Date of Patent: Sep. 23, 2014

(54) DEVICE CHARGING OVER USB USING A PLURALITY OF HANDSHAKES

(75) Inventors: Atish Ghosh, Austin, TX (US); Matthew Kalibat, Austin, TX (US)

(73) Assignee: SMSC Holdings S.A.R.L., Luxembourg (LU)

( * ) Notice: Subject to any disclaimer, the term of this patent is extended or adjusted under 35 U.S.C. 154(b) by 381 days.

(21) Appl. No.: 13/285,202

(22) Filed: Oct. 31, 2011

(65) Prior Publication Data

US 2013/0111100 A1    May 2, 2013

(51) Int. Cl.
*G06F 1/00*    (2006.01)
*G06F 1/26*    (2006.01)

(52) U.S. Cl.
CPC ..................... *G06F 1/266* (2013.01)
USPC .............. 713/300; 710/16; 710/104

(58) Field of Classification Search
CPC ............. G06F 1/266; G06F 2213/0042; H02J 2007/0001; H02J 2007/0062; H02M 2001/0012; H02M 2001/008
USPC ........................ 713/300, 310; 710/15–18, 104
See application file for complete search history.

(56) References Cited

U.S. PATENT DOCUMENTS

| | | | |
|---|---|---|---|
| 5,848,298 A | 12/1998 | Steere, Jr. et al. | |
| 5,884,086 A | 3/1999 | Amoni et al. | |
| 6,046,575 A | 4/2000 | Demuro | |
| 6,184,652 B1 | 2/2001 | Yang | |
| 6,253,329 B1 | 6/2001 | Kang | |
| 6,304,060 B1 | 10/2001 | Dernehl | |
| 6,308,239 B1 | 10/2001 | Osakada et al. | |
| 6,363,491 B1 | 3/2002 | Endo | |
| 6,477,363 B1 | 11/2002 | Ayoub et al. | |
| 6,493,770 B1 | 12/2002 | Sartore et al. | |
| 6,507,172 B2 | 1/2003 | Sherman | |
| 6,531,845 B2 | 3/2003 | Kerai et al. | |
| 6,532,512 B1 | 3/2003 | Torii et al. | |
| 6,541,879 B1 | 4/2003 | Wright | |
| 6,622,195 B2 | 9/2003 | Osakada et al. | |
| 6,665,801 B1 | 12/2003 | Weiss | |
| 6,669,513 B2 | 12/2003 | Huang | |

(Continued)

FOREIGN PATENT DOCUMENTS

CN    102156524 A    8/2011    ................ G06F 1/26
EP    0 982 663    3/2000

(Continued)

OTHER PUBLICATIONS

USBIF. PlusPower. Electro-Mechanical Specification. Version 0.8f. 1999.*

(Continued)

*Primary Examiner* — Matthew D Spittle
(74) *Attorney, Agent, or Firm* — King & Spalding L.L.P.

(57) ABSTRACT

Charging a device using a plurality of handshakes. A first device may provide a first handshake to a second device. A device of a first device type may be configured to charge its battery without further communication based on the first handshake. The first device may monitor a connection to the second device for a second handshake corresponding to a device of a second device type. In response to detecting the second handshake, the first device may provide a response to the second device. Accordingly, the second device of the second device type may be configured to charge its battery based on the second handshake.

18 Claims, 4 Drawing Sheets

(56) References Cited

U.S. PATENT DOCUMENTS

| | | | |
|---|---|---|---|
| 6,732,218 B2 | 5/2004 | Overtoom et al. | |
| 6,753,671 B1 | 6/2004 | Harvey | |
| 6,798,173 B2* | 9/2004 | Hsu | 320/134 |
| 6,904,373 B2 | 6/2005 | Le et al. | |
| 6,936,936 B2* | 8/2005 | Fischer et al. | 307/151 |
| 6,946,817 B2 | 9/2005 | Fischer et al. | |
| 7,017,055 B1 | 3/2006 | Ho | |
| 7,034,503 B2 | 4/2006 | Veselic et al. | |
| 7,069,347 B1 | 6/2006 | Kolokowsky | |
| 7,093,031 B2 | 8/2006 | Ray et al. | |
| 7,151,950 B1 | 12/2006 | Oyang et al. | |
| 7,170,259 B2 | 1/2007 | Veselic | |
| 7,193,442 B2* | 3/2007 | Zhu | 326/82 |
| 7,271,568 B2 | 9/2007 | Purdy et al. | |
| 7,305,243 B1 | 12/2007 | Tendler | |
| 7,310,697 B2 | 12/2007 | Pandit et al. | |
| 7,340,627 B1 | 3/2008 | Harvey | |
| 7,358,703 B2 | 4/2008 | Veselic | |
| 7,373,528 B2 | 5/2008 | Schindler | |
| 7,421,594 B2 | 9/2008 | Nakajima et al. | |
| 7,447,922 B1* | 11/2008 | Asbury et al. | 713/300 |
| 7,501,792 B2 | 3/2009 | Borjeson et al. | |
| 7,523,338 B2 | 4/2009 | Fu et al. | |
| 7,624,202 B2* | 11/2009 | Monks et al. | 710/15 |
| 7,631,111 B2* | 12/2009 | Monks et al. | 710/15 |
| 7,656,132 B2 | 2/2010 | So et al. | |
| 7,782,022 B2 | 8/2010 | Xu et al. | |
| 8,055,919 B2* | 11/2011 | Magnusson | 713/300 |
| 8,283,897 B2* | 10/2012 | Veselic et al. | 320/155 |
| 8,296,587 B2* | 10/2012 | Paniagua et al. | 713/300 |
| 8,332,545 B1* | 12/2012 | Monks et al. | 710/8 |
| 8,344,874 B2* | 1/2013 | Fadell | 340/538 |
| 8,386,814 B2* | 2/2013 | Tom et al. | 713/300 |
| 2004/0021440 A1 | 2/2004 | Pannwitz | |
| 2004/0221180 A1 | 11/2004 | Enami et al. | |
| 2004/0239294 A1 | 12/2004 | Veselic et al. | |
| 2004/0251878 A1 | 12/2004 | Veselic | |
| 2005/0131495 A1 | 6/2005 | Parramon et al. | |
| 2005/0144495 A1 | 6/2005 | Nakajima et al. | |
| 2005/0174094 A1 | 8/2005 | Purdy et al. | |
| 2006/0022637 A1 | 2/2006 | Wang et al. | |
| 2006/0095641 A1 | 5/2006 | Pandit et al. | |
| 2006/0112288 A1 | 5/2006 | Schindler | |
| 2006/0181241 A1 | 8/2006 | Veselic | |
| 2006/0287007 A1 | 12/2006 | Veselic et al. | |
| 2007/0022311 A1* | 1/2007 | Park | 713/310 |
| 2007/0035276 A1 | 2/2007 | Webjorn | |
| 2007/0058332 A1 | 3/2007 | Canterbury et al. | |
| 2007/0088967 A1 | 4/2007 | Fu et al. | |
| 2007/0143505 A1 | 6/2007 | Terrell | |
| 2007/0220287 A1 | 9/2007 | Sang-Heon | |
| 2008/0042616 A1 | 2/2008 | Monks et al. | |
| 2008/0126594 A1 | 5/2008 | Monks et al. | |
| 2008/0207277 A1 | 8/2008 | Sunda | |
| 2011/0016334 A1* | 1/2011 | Tom et al. | 713/300 |
| 2011/0016341 A1 | 1/2011 | Tom et al. | 713/340 |
| 2012/0210146 A1 | 8/2012 | Lai et al. | 713/310 |

FOREIGN PATENT DOCUMENTS

| | | |
|---|---|---|
| GB | 2352540 | 1/2001 |
| JP | 2000-242377 | 9/2000 |
| JP | 2001-043178 | 2/2001 |
| KR | 10-2004-0008365 | 1/2004 |
| KR | 10-0490068 | 5/2005 |

OTHER PUBLICATIONS

Hewlett-Packard Company et al. Universal Serial Bus 3.0. Specification. Revision 1.0. Nov. 12, 2008.*

USBIF. On-The-Go Supplement to the USB 2.0 Specification. Revision 1.0a. Jun. 24, 2003.*

International Search Report and Written Opinion, Application No. PCT/US2012/055973, 12 pages, Apr. 5, 2013.

SMSC UCS1001, USB Port Power Controller with Charger Emulation—Data Sheet, Revision 1.0 (Aug. 18, 2011), 56 pages.

SMSC UCS1001, USB Port Power Controller with Charger Emulation—Data Brief, Revision 1.0 (Aug. 26, 2011), 5 pages.

SMSC UCS1002, Programmable USB Port Power Controller with Charger Emulation—Data Brief, Revision 1.0 (Aug. 26, 2011), 5 pages.

Compaq et al., "Universal Serial Bus Specification Revision 2.0" Apr. 27, 2000, p. 171-177.

SMSC USB2524, USB MulitSwitch Hub—Datasheet, Revision 1.2 (Jul. 17, 2006), 57 pages.

National Semiconductor, LM3658 Dual Source USB/AC Li chemistry Charger IC for Portable Applications, May 2005, 14 pages.

Terry Remple, Megan Hayes and Dave Wilson, "CEA-936-A USB Carkit Specification," Aug. 11, 2005, Consumer Electronics Association (CEA) R6 Mobile Electronics Committee, 97 pages.

Carlson, Brian, "SmartReflex power and performance management technologies—reduced power consumption, optimized performance," Texas Instruments, 2005, 8 pages.

Wireless Handsets: TWL4030, Texas Instruments, online at http://focus.ti.com/general/docs/wtbu/wtbugencontent.tsp?templateId=6123&-contentId=4634&DCMP=WTBU&HQS=ProductBulletin+OT+twl4030. 2005 Ti, Inc., 2 pages. [Retrieved May 21, 2007].

Programmable Multi-Host Device Sharing USB Hub, IBM Research Disclosure, XP-002145746, Feb. 1999, vol. 418, No. 92, 1 page.

\* cited by examiner

DEVICE CHARGING OVER USB USING A PLURALITY OF HANDSHAKES

FIELD OF THE INVENTION

The present invention relates to the field of Universal Serial Bus (USB), and more particularly to a system and method for charging a device over USB using a plurality of handshakes.

DESCRIPTION OF THE RELATED ART

In recent years, there has been a proliferation of portable USB devices that utilize power provided by a battery. For example, many people own or purchase various portable devices such as cell phones, music players, video players, and laptops, among other devices.

In using such portable devices, users often require that they be easily recharged, e.g., using various electrical outlets, e.g., in a house or car. Most users that own or purchase these devices also own host device(s), e.g., a computer, which supports USB communication/devices. In such cases, it is often convenient to charge the portable devices using power supplied by the host device, e.g., using the USB connection. Alternatively, users may have chargers that are configured to plug into an electrical socket and charge devices. In order to reduce ports on the devices, these chargers are often configured to provide power over USB rather than through a dedicated charging cable. Even further, some USB hosts are configured to provide power above an enumeration power level for supported devices.

Because of these possibilities, various device manufacturers have developed different methods for charging their devices. Accordingly, it is often difficult for hosts (or intermediary devices) to determine and support the plurality of different charging methods that are available in the marketplace. Similar scenarios are true for other communication protocols and charging systems. Thus, improvements in performing battery charging are desired.

SUMMARY OF THE INVENTION

Various embodiments of a system and method for charging a device using a plurality of handshakes are presented herein.

A first device and a second device may be coupled or connected together. The second device is the device that is desired to be charged, and the first device is the device that provides power to charge the second device. For example, the first and second devices may be Universal Serial Bus (USB) devices. In one embodiment, the first device may be a USB hub, e.g., which may be connected to an external power source (e.g., an electrical outlet) and/or a USB host, such as a computer system. In some embodiments, the first device may be integrated in a USB host, such as a computer system.

Initially, the first device may provide a first handshake to the second device. In one embodiment, the first device may operate in at least a first state and a second state. In the first state, the first device may be configured to provide the first handshake continuously. In some embodiments, the first handshake may indicate a maximum level of current or power that the second device may draw. For example, some devices (e.g., of the first type) may be configured to draw different levels of power or current, and the first handshake may indicate the highest level that can or should be drawn from the first device. Note that the first device (or different first devices) may be configured to provide different levels in the first handshake, e.g., depending on the situation. For example, the first handshake may indicate 1 A, 1.5 A, 2 A, etc. as the maximum level.

A second device of a first device type may be configured to charge its battery using power provided by the first device without further communication with the first device, based on the first handshake. For example, in one embodiment, the first handshake may be passive, where second devices of the first device type simply begin charging in response to the first handshake without performing any communication with the first device. Accordingly, if the second device is of the first device type, it may be configured to charge its battery without communication to and/or from the first device. Note that this passive embodiment is exemplary only, and other more active embodiments are envisioned. However, if the second device is not of the first device type, the second device may not be able to begin charging its battery.

Accordingly, the first device may monitor the connection to the second device for a second handshake corresponding to a device of a device type that is different than the first device type, e.g., a second device type. The second handshake may be used to allow the second device to charge its battery. In some embodiments, the second handshake may include a line state change of a connection between the first device and the second device.

In response to detecting the second handshake, the first device may provide a response to the second device. Based on this response, the second device may be configured to charge its battery using power provided by the first device, based on the second handshake. The response may be appropriate for multiple different device types. For example, a first device type may expect a first handshake (e.g., different from the first handshake discussed above), and a second device type may expect a second handshake. Accordingly, the second handshake may fulfill the requirements for both handshakes at the same time (or at least the receiving device may respond to it, regardless of whether it is of the first or second type). Alternatively, multiple different handshakes may be used in response to receiving the second handshake, e.g., in a sequential fashion.

In some embodiments, the response may include power cycling the second device, in response to the second handshake. Alternatively, or additionally, the power cycling may be performed in addition to the response. After power cycling, the first device may wait for a first period of time, e.g., to allow the second device to boot or respond. In some embodiments, this procedure may be implemented using states, such as those described above. For example, providing the first handshake may occur in the first state of the first device, and the second state may be entered in response to detecting the second handshake. Accordingly, upon entering the second state, the response may be provided, the second device may be power cycled, and the second state may be maintained for a period of time.

Later, a disconnect of the second device may be detected, e.g., while in the second state. Upon detecting the disconnection, the first device may re-enter the first state. In the first state, the first handshake may be provided continuously, in case a device of the first device type is connected. Thus, the method may be performed again for a new device.

As noted above, the first device may be coupled to or included within a host device. Accordingly, the first device may also be configured to perform enumeration of the second device with the host device. The first device may also be configured to provide a third handshake, e.g., for performing high power charging while enumerated. Alternatively, the first device and second device may operate according to a typical USB session, without high power charging (that is, above typical enumeration power, e.g., 500 mA).

While the above is described with respect to USB, other protocols and device types are envisioned.

BRIEF DESCRIPTION OF THE DRAWINGS

A better understanding of the present invention can be obtained when the following detailed description of the preferred embodiment is considered in conjunction with the following drawings, in which.

Figure 1:
FIGS. 1-3 illustrate exemplary systems suitable for implementing various embodiments of the invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. Pat. No. 7,631,111, titled "System and Method for Rapidly Charging a USB Device", filed Aug. 17, 2006.

TERMS

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network and/or other physical transmission medium, that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
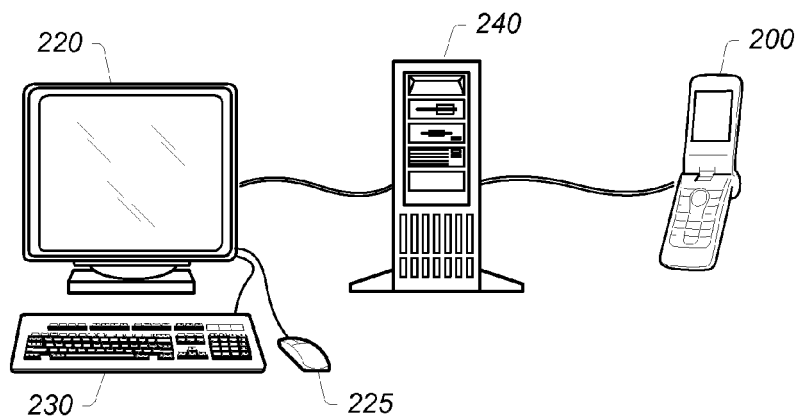
Figure 3:
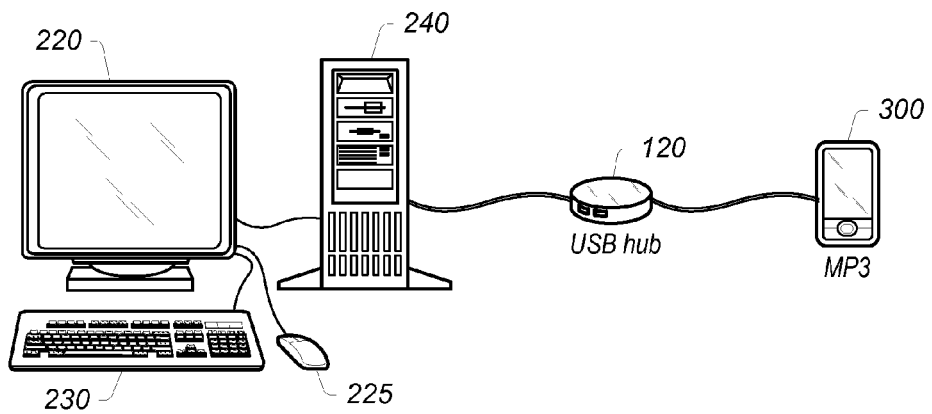

FIGS. 1-3—Exemplary Systems

FIG. 1 illustrates one embodiment of an exemplary system operable to enumerate a USB device 100 and/or charge the battery of the USB device 100. As shown, the USB device 100 may be coupled to host device 140, e.g., via a USB hub 120. Note that in some embodiments one or more of the elements shown in FIGS. 1-3 may be omitted, e.g., the host device 140 and/or the USB hub 120, among others. For example, the USB device 100 may be coupled directly to the host device 140, e.g., without the USB hub 120. Alternatively, the USB device 100 may only be coupled to the USB hub 120; such embodiments may allow the USB device 100 to be charged via the USB hub 120.

Note that the above-described connections/configurations are exemplary only and other configurations are envisioned. More specifically, embodiments for charging using a plurality of handshakes are not limited to the exemplary configurations described above. For example, the host device 140, and/or the USB hub 120 may be omitted or included in the host device 140 as desired. Additionally, the USB hub 120 may be swapped with a different type of device, such as a laptop cradle that is configured to perform the embodiments describe herein, although even in such a case, it would be likely that the laptop cradle would include a USB hub. In other words, other intermediary devices than USB hub 120 are envisioned for performing embodiments described herein.

The USB device 100 may be any of numerous devices. For example, the USB device 100 may be a cell phone (e.g., cell phone 200 illustrated in FIG. 2), a personal music player (e.g., player 300 illustrated in FIG. 3, e.g., an mp3 player, and/or an IPOD™, among other players, a CD player, etc.), a personal video player (e.g., the player 300 illustrated in FIG. 3, e.g., a digital video player, a DVD player, etc.), a peripheral device (e.g., a printer), an input device (e.g., a game controller, touchpad, mouse, and/or keyboard, among others), or any other device that requires battery charging or drawing power or current above a typical level (e.g., an enumeration level of 500 mA). Thus, the USB device 100 may be any of a variety of appropriate devices.

Additionally, the host device 140 may be any of various host devices; more specifically, the host device 140 may be a computer system, e.g., such as computer system 240 illustrated in FIGS. 2 and 3, a USB hub, e.g., an external USB hub or one included in an electronic system (e.g., the computer system 240 or display device 220, among others), and/or other types of host devices, e.g., ones that provide power for charging the USB device 100. Alternatively, or additionally, the host device 140 may be a second USB device, e.g., similar to the USB device 100, among others. For example, in one embodiment, the second USB device may be a USB on-the-go (OTG) device which may be operable to act as a host and a device, e.g., depending on the situation. Thus, according to various embodiments the host device 140 may be any of various appropriate devices.

In some embodiments, the USB hub 120 may be a passively powered device, e.g., where the USB hub 120 receives power provided by the host device 140 (e.g., the motherboard of the computer system 240), and/or an actively powered device, e.g., where the USB hub 120 receives power from a power source, e.g., a wall socket, a battery (such as, for example, of an automobile, e.g., from the lighter of the automobile), and/or other power supplies (e.g., a power supply of the host device 140, e.g., of the computer system 240). More specifically, in one embodiment, actively powered may mean that the USB hub 120 is powered from a power source which will not limit the consumption of power by the USB device, e.g., limit the consumption according to a standard, such as, for example the USB specification. In some embodiments, the USB hub 120 may include one or more ports for coupling to various devices, e.g., the USB device 100 and/or the host device 140. Thus, the USB hub 120 may be powered actively and/or passively and provide communications between a host device and a device, among other capabilities.

As shown in FIGS. 2 and 3, the computer system 240 may include/couple to the display device 220 operable to display video signals received from the computer system 240 and/or to act as a USB hub. In other words, the display device 220 may act as the USB hub 120 as well as displaying video signals from the host device 140 (e.g., the computer system 240). Additionally, the computer system 240 may include keyboard 230 and mouse 225 which may be USB device. Keyboard 230 and mouse 225 may couple to the computer system 240 in a variety of ways, e.g., directly to the computer 240 or via the USB hub included in the display device 220, among other methods. Thus, in FIGS. 2 and 3, the keyboard 230 and mouse 225 are shown coupled to the display 220, which may act as a USB hub. Alternatively, the keyboard 220 and mouse 225 may be coupled to the computer system 240, e.g., a hub in the computer system 240.

Additionally, the computer system 220 may include at least one memory medium on which one or more computer programs or software components may be stored. For example, the memory medium may store operating system software, as well as other software for operation of the computer system 240. Various embodiments further include receiving or storing instructions and/or data implemented in accordance with the foregoing description upon a carrier medium. Note that the above descriptions of the host device 140, the USB device 100, the computer system 240 (and components therein, e.g., input devices), and the display device 220 are exemplary only and other components and systems are envisioned.

As shown in FIG. 2, the cell phone 200 (e.g., the USB device 100) may couple to the computer system 240 (e.g., the host device 140). More specifically, in some embodiments, the USB device 100, e.g., the cell phone 200, may couple to a hub included in the computer system 240. Thus, in some embodiments, the USB device 100 may couple directly to a USB port included in the computer system 240. However, as noted above (and shown in FIG. 3), the USB device 100 may couple indirectly, e.g., through USB hub 120 or other devices.

In the example shown in FIG. 3, the player 300 may be coupled to the USB hub 120 which may in turn be coupled to the computer system 240. Alternatively, in some embodiments, the configuration may be different; for example, as indicated above, the display device 220 and/or the computer system 240 may include a USB hub (e.g., passively or actively powered). Correspondingly, in one embodiment, the USB device 100 may couple to the display device 220 which may in turn provide power to the USB device 100. The display device 200 may also provide USB communication between the USB device 100 and the computer system 240 (e.g., the host device 140). Thus, FIGS. 1-3 illustrate exemplary systems for enumeration and/or charging of USB devices.

Figure 4:
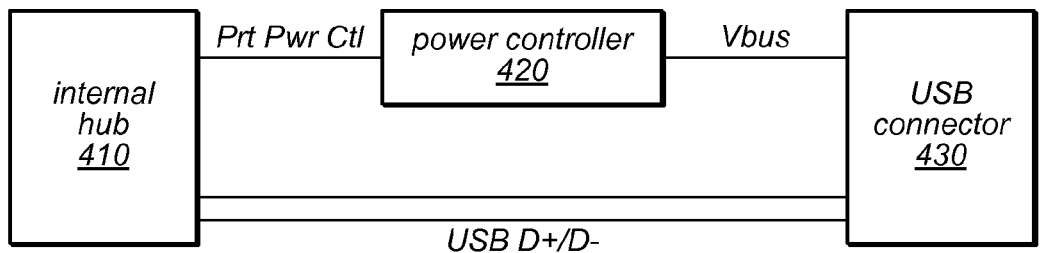
FIG. 4 is a block diagram of an exemplary system, according to one embodiment.

FIG. 4—Exemplary Block Diagram

FIG. 4 is a block diagram of an exemplary system that may be implemented with the USB hub 120, among other similar types of devices. More specifically, the USB hub 120 may include internal logic, such as internal hub 410, for providing the functionality of the USB hub 120. Additionally, the USB hub 120 may include a USB connector 430 for coupling to other USB devices. As shown, the D+/D− lines of the internal hub 410 may be directly connected to the USB connector 430. However, a power controller 420 may be implemented between the internal hub 410 and the USB connector 430. The power controller 420 may be used to control power levels and/or portions of handshakes described herein. For example, the internal hub 410 may provide power control signals to the power controller 420 for controlling the amount of power or current provided to the USB connector 430 (and therefore any connected devices) via the Vbus line. Similar power controllers 420 may be provided for other USB connectors 430 of the USB hub 120.

Figure 5:
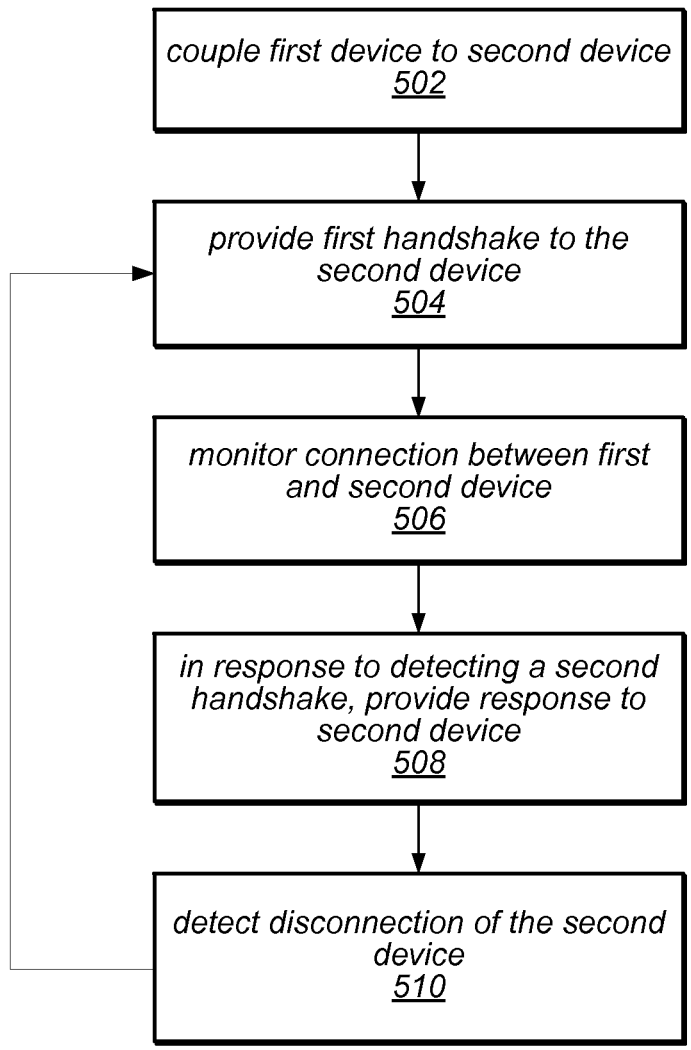
FIGS. 5-7 are flowchart diagrams illustrating embodiments of a method for charging a device using a plurality of handshakes.

FIG. 5—Charging a Device Using a Plurality of Handshakes

FIG. 5 illustrates a method for charging a device using a plurality of handshakes. The method shown in FIG. 5 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

In 502, a first device and a second device may be coupled or connected together. For example, the first and second devices may be Universal Serial Bus (USB) devices. In one embodiment, the first device may be a USB hub, e.g., which may be connected to an external power source (e.g., an electrical outlet) and/or a USB host, such as a computer system. In some embodiments, the first device may be integrated in a USB host, such as a computer system. Thus, the first device may correspond to the USB host device 140 and/or the USB hub 120, although other variations are envisioned. Similarly, the second device may correspond to the USB device 100 which is desired to be charged as described above. Thus, in one embodiment, a user may physically attach the USB device 100 to the USB host device 140.

In one embodiment, the coupling of the first device and the second device may be detected. The detection of the coupling may be performed via any of numerous appropriate methods. For example, in one embodiment, when the USB devices are coupled, a change in the electrical characteristics of the wires connecting the two systems may be detected by one or both of the systems. In one embodiment, the second device may detect coupling to the first device by detecting provision of power by the first device, e.g., on a VBUS line in the USB connection. Additionally, the first device may detect coupling of the second device by detecting a signal transmitted by the second device to the first device. However, it should be noted that the first device may not detect the second device upon coupling, e.g., when the second device operates in a passive manner (e.g., where the second device does not provide signals to the first device upon connection).

Initially, in 504, the first device may provide a first handshake to the second device. In some embodiments, the first handshake may indicate a maximum level of current or power that the second device may draw. For example, some devices (e.g., of the first type) may be configured to draw different levels of power or current, and the first handshake may indicate the highest level that can or should be drawn from the first device. Note that the first device (or different first devices) may be configured to provide different levels in the first handshake, e.g., depending on the situation. For example, the first handshake may indicate 1 A, 1.5 A, 2 A, etc. as the maximum level.

In one embodiment, the first device may operate in at least a first state and a second state. In the first state, the first device may be configured to provide the first handshake continuously. For example, the first handshake may be provided continuously regardless of whether a device (such as the second device) is coupled to the first device. This continuous provision may be particularly useful for devices which passively charge their batteries, without performing further communication. Said another way, a device of a first device type may be configured to charge its battery without further communication, based on the first handshake. For example, in one embodiment, the first handshake may be passive, where devices of the first device type simply begin charging in response to the first handshake without performing any communication with the first device. In one embodiment, such a passive handshake may be indicated based on voltage levels of the lines (e.g., Vbus, D+, and/or D-) in the connection between the first and second device. Accordingly, if the second device is of the first device type, it may be configured to charge its battery without communication to and/or from the first device. Note that this passive embodiment is exemplary only, and other more active embodiments are envisioned. However, if the second device is not of the first device type, the second device may not be able to begin charging its battery, unlike devices of the first device type.

Accordingly, in 506, the first device may monitor the connection to the second device for a second handshake corresponding to a device of a device type that is different than the first device type, e.g., a second device type. The second handshake may be used to allow the second device to charge its battery. In some embodiments, the second handshake may include a line state change of a connection between the first device and the second device.

In 508, in response to detecting the second handshake, the first device may provide a response to the second device. Based on this response, the second device may be configured to charge its battery based on the second handshake. The response may be appropriate for multiple different device types. For example, a first device type may expect a first handshake (e.g., different from the first handshake discussed above), and a second device type may expect a second handshake. Accordingly, the second handshake may fulfill the requirements for both handshakes at the same time (or at least the receiving device may respond to it, regardless of whether it is of the first or second type). Alternatively, multiple different handshakes may be used in response to receiving the second handshake, e.g., in a sequential fashion.

In some embodiments, the response may include power cycling the second device, in response to the second handshake. Alternatively, or additionally, the power cycling may be performed in addition to the response. After power cycling, the first device may wait for a first period of time, e.g., to allow the second device to boot or respond. In some embodiments, this procedure may be implemented using states, such as those described above. For example, providing the first handshake may occur in the first state of the first device, and the second state may be entered in response to detecting the second handshake. Accordingly, upon entering the second state, the response may be provided, the second device may be power cycled, and the second state may be maintained for a period of time.

Later, in 510, a disconnect of the second device may be detected, e.g., while in the second state. Upon detecting the disconnection, the first device may re-enter the first state. In the first state, the first handshake may be provided continuously, in case a device of the first device type is connected. Thus, the method may be performed again for a new device.

As noted above, the first device may be coupled to or included within a host device. Accordingly, the first device may also be configured to perform enumeration of the second device with the host device. The first device may also be configured to provide a third handshake, e.g., for performing high power charging while enumerated. Alternatively, the first device and second device may operate according to a typical USB session, without high power charging (that is, above typical enumeration power, e.g., 500 mA).

While the systems and methods discussed herein are described with respect to USB devices, other protocols and device types are envisioned.

Further Exemplary Details Related to the Method of FIG. 5

The following provides further exemplary details of embodiments described above. These portions are provided only to provide examples of the above method and are not intended to limit the scope of the descriptions herein. Thus, while specific protocols, handshakes, and values are provided, these are exemplary only and other specific details are envisioned.

Embodiments described herein may provide a mechanism for USB 2.0 downstream ports to be compatible with the widest possible range of USB battery charging devices, e.g., without using current sensing port power controllers. In some embodiments, portions of the method may only be operational when the downstream port is not required to act as a standard USB 2.0 downstream port, e.g., when the downstream port's parent hub (or other type of device) is not attached to a host.

In such situations, the charging port may initially present a passive handshake, e.g., such as those used by devices provided by Apple. The passive handshake may be presented first because these devices may passively detect a charging port. Accordingly, there would be no way for the algorithm to detect a passive device and switch to the proper handshake if another handshake were presented first. Thus, following this example, if a passive device is plugged to the charging port, it will detect the passive charging handshake and begin charging.

If a compatible generic charging device is connected, the charging port may detect the device and change the presented handshake from the passive handshake. Accordingly, the compatible charging device may begin charging. Note that this solution may support charging device removal detection so charging devices can be inserted in any order.

Figure 6:
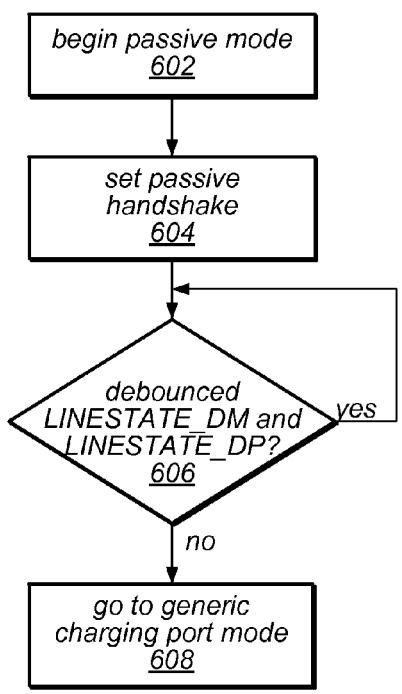

In more detail, FIG. 6 provides is a flow chart corresponding to the presentation of passive handshakes. More specifically, upon entering the passive charging mode in 602 (e.g., the first state discussed above), the charging port may present the passive handshake (or "Apple" handshake) in 604.

If a passive device is attached, it may passively detect the handshake and begin to charge. Accordingly, the charging port may remain in passive charging mode and does not need to take further action.

However, if the attached device is not passive, e.g., if a BC 1.2 device is attached, its $I_{DMSINK}$ may be strong enough to pull the D− line low. Likewise, generic charging devices have been observed to pull the D− line low upon attach or connection. To accommodate this, the downstream port transitions to generic charging port mode in 608 if the classic D− linestate is detected as low in 606 (although other conditions are also envisioned). In one embodiment, the D+ and/or D− linestate may be debounced to avoid false detects from device plug-ins.

Figure 7:
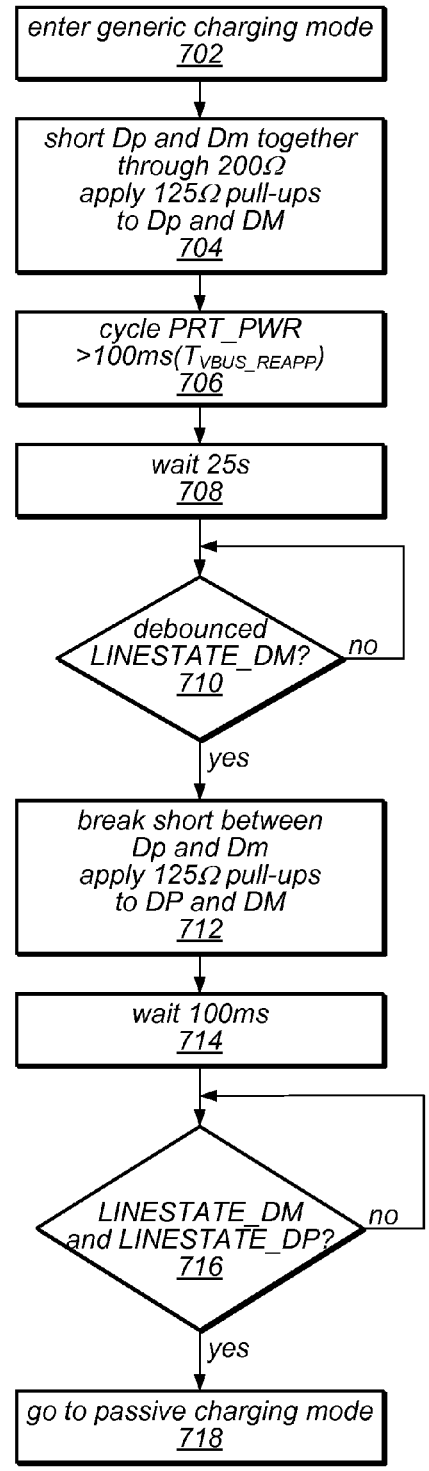

Turning now to FIG. 7, upon entering generic charging port mode in 702, the downstream port may connects D+ and D− through 200Ω and a weak 125Ω pull-up is applied to D+ in 704 and cycle port power for more than $T_{VBUS\_REAPP}$=100 ms in 706 (as described in section 4.1.3 of Battery Charging Specification, Revision 1.2, which is hereby incorporated by reference in its entirety), although other responses are envisioned.

At that point, at 708, the generic charging port may wait 25 s for the charging device to detect the generic charging port. Because the downstream port may need to return to passive charging mode if a device is removed, the generic charging port continuously monitors the D+ linestate after the 25 s in 710. More specifically, if the charging device is removed, the D+ may be pulled high by the weak 125Ω pull-up on D+.

Some charging devices either tri-state their D+/D− outputs or pull D+ high when done with the charging port detection. With these devices, the downstream port may see D+ as high even though the device has not been removed. In general, it is not a problem to go to passive charging mode in with these devices still inserted because the device has already completed its handshake by that time. However, because such a device may also pull D− low, the downstream port may not simply enter passive charging mode immediately upon detection of D+ going high; otherwise, the downstream port may erroneously detect a new charging device (and therefore cycle port power) when in passive charging mode. Therefore, before going back to passive charging mode, the downstream port may first break the connection between D+ and D−, enable a weak pull-up on both D+ and D− in 712, wait 100 ms in 714, and check that both D+ and D− are high in 716. If they are both high, it is safe to return to passive charging mode in 718.

The following outlines various possibilities for the hub or other device:

If battery charging for the host is not enabled, the charging port may behave as a normal USB port. For example, the power may be turned on if there is a host present, and may be turned off if there no USB host. Similarly, typical enumeration may be performed. There may be no special battery charging involved.

If battery charging is enabled, and there is no USB host present, the charging port may behave as a dedicated charger, with the appropriate handshake.

If battery charging is enabled, and the USB host is present, the charging port may provide a handshake using the dedicated USB battery charging handshake.

ADVANTAGES OF THE DESCRIBED EMBODIMENTS

Embodiments described herein may allow a USB 2.0 or USB 3.0 hub to perform battery charging on any number of downstream USB ports without the need for an expensive battery charging enabled port power controller with current sensing. Such BC controllers use a technique of monitoring the current draw of the port, as they cycle through multiple handshakes.

Typically, the BC controllers assume that the handshake that draws the most current is the correct handshake. This requires a specialized expensive port power controller that senses current. However, using embodiments described above, which may rely on a handshake protocol, allows the port to support battery charging with a multitude of devices without requiring an external current sensing battery charging controller.

Further, using current draw as a means of identification suffers from the problem that the current draw varies based on the charge state of the battery leading to misidentification of the attached device. This often results in cycling indefinitely. For instance, a Blackberry phone may draw no current if fully charged, then draw 800 mA when down to only 95%. As another example, many charging devices may "trickle charge", with a dead or nearly dead battery. A current-sensing based charging solution may then be in an improper state when the charging device is ready to draw more current.

Since these controllers are external to the hub, they do not know the system state. Thus, there is no way to modify current draw based on system state.

Additionally, beyond the cost, such BC controllers have the additional disadvantage of degrading USB signal quality because they add a load in the data path of several ohms, which reduces the opening in the USB eye diagram.

Accordingly, embodiments described above may have no additional cost over a non-battery charging port, while supporting more charging devices than would be provided via a BC controller. Further, these embodiments may not affect standard USB 2.0 signaling/operation in any way. Additionally, because various embodiments do not rely on identifying many different specific handshakes/current profiles, it provides greater compatibility with new/unknown devices. Finally, by not depending on the state of the charging device's battery, more consistent behavior may be achieved.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A USB device, comprising:
a power port for receiving power from a power source;
one or more device ports for coupling to devices, wherein the one or more device ports are coupled to the power port, wherein the one or more device ports are configured to provide at least a portion of the power from the power source to a device coupled to the one or more device ports, wherein the at least a portion of the power is usable by the device coupled to the one or more device ports to charge a battery of the device;

device logic coupled to the power port and the one or more device ports, wherein the device logic is configured to:
provide a first handshake to a first device port of the one or more device ports, wherein a device of a first device type coupled to the first device port is configured to charge its battery without further communication from the USB device based on the first handshake and wherein the first handshake indicates a maximum level of current;

monitor the first device port for a second handshake from a device of a second device type coupled to the first device port; and in response to detecting the second handshake, provide a first response to the device of the second device type, wherein the device of the second device type is configured to charge its battery based on the first response to the second handshake.

2. The USB device of claim 1, further comprising:
providing a second response to the device of the first type upon detecting the second handshake.

3. The USB device of claim 1, wherein the device logic is further configured to:
in response to detecting the second handshake, power cycle the device of the first device type.

4. The USB device of claim 3, wherein the device logic operates in at least a first state and a second state, wherein said providing the first handshake is performed in the first state, wherein, the device logic is further configured to:
in response to detecting the second handshake, enter the second state; and
remain in the second state for a first period of time after said power cycling the device of the first device type.

5. The USB device of claim 1, wherein the device logic operates in at least a first state and a second state, wherein said providing the first handshake is performed in the first state, wherein, the device logic is further configured to:
in response to detecting the second handshake, enter the second state;
detect a disconnection of the device of the second device type; and
enter the first state in response to said detecting the disconnection.

6. The USB device of claim 1, wherein the device logic operates in at least a first state and a second state, wherein said providing the first handshake is performed continuously in the first state.

7. The USB device of claim 1, wherein said detecting the second handshake comprises detecting a line state change of a connection between the first device port and the device of the second device type.

8. The USB device of claim 1, wherein the USB device comprises a USB hub, wherein the USB device comprises an upstream port for coupling to a USB host.

9. The USB device of claim 8, wherein the device logic is further configured to:
perform enumeration of the second device of the second device type with the USB host; and
provide a third handshake to the device of the second device type, wherein the device of the second device type is configured to charge its battery above an enumeration power level based on the third handshake.

10. A method for charging a device, comprising:
providing, by a first device, a first handshake to a second device, wherein a second device of a first device type is configured to charge its battery without further communication based on the first handshake and wherein the first handshake indicates a maximum level of current;
monitoring, by the first device, a connection to the second device for a second handshake corresponding to a second device of a second device type; and
in response to detecting the second handshake, providing, by the first device, a first response to the second device of the second device type, wherein the second device of the second device type is configured to charge its battery based on the first response to the second handshake.

11. The method of claim 10, further comprising:
providing a second response to the second device of the first type upon detecting the second handshake.

12. The method of claim 10, further comprising:
in response to detecting the second handshake, power cycle the second device of the first type.

13. The method of claim 12, wherein the first device operates in at least a first state and a second state, wherein said providing the first handshake is performed in the first state, wherein, the method further comprises:
in response to detecting the second handshake, entering, by the first device, the second state; and
remaining, by the first device, in the second state for a first period of time after said power cycling the second device of the first device type.

14. The method of claim 10, wherein the first device operates in at least a first state and a second state, wherein said providing the first handshake is performed in the first state, wherein, the method further comprises:
in response to detecting the second handshake, entering, by the first device, the second state;
detecting, by the first device, a disconnection of the second device of the second device type; and
entering, by the first device, the first state in response to said detecting the disconnection.

15. The method of claim 10, wherein the first device operates in at least a first state and a second state, wherein said providing the first handshake is performed continuously in the first state.

16. The method of claim 10, wherein said detecting the second handshake comprises detecting a line state change of a connection between the first device and the second device of the second device type.

17. The method of claim 10, wherein the first device comprises a USB hub, wherein the second device comprises a USB device, wherein the method further comprises:
connecting, by the USB hub, to a USB host;
performing enumeration, by the USB hub, of the USB device with the USB host; and
providing, by the USB hub, a third handshake to the USB device, wherein the USB device is configured to charge its battery above an enumeration power level based on the third handshake.

18. A non-transitory computer accessible memory medium storing program instructions for charging a second device by a first device, wherein the program instructions are executable by a processor to:
provide a first handshake to the second device, wherein a second device of a first device type is configured to charge its battery without further communication based on the first handshake and wherein the first handshake indicates a maximum level of current;
monitor a connection to the second device for a second handshake corresponding to a second device of a second device type; and
in response to detecting the second handshake, provide a response to the second device of the second device type, wherein the second device of the second device type is configured to charge its battery based on the response to the second handshake.

\* \* \* \* \*